Figure 1:
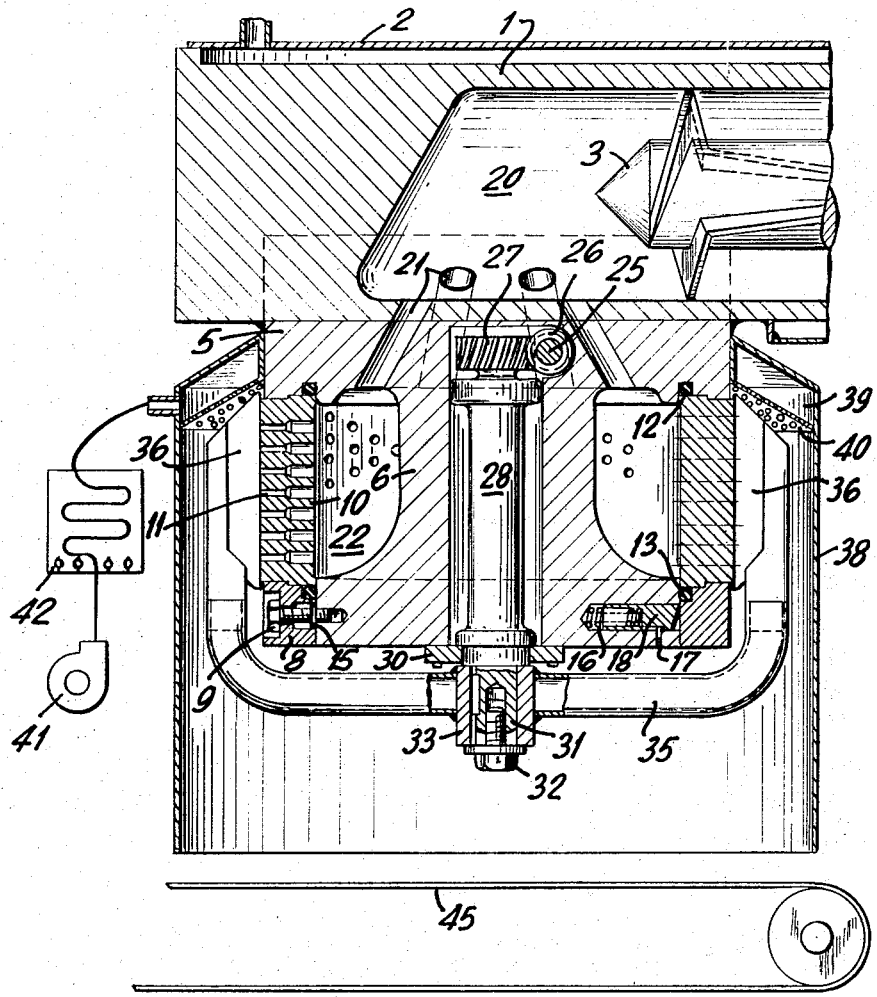

Jan. 3, 1967 R. VASSALLI 3,295,469
ALIMENTARY PASTE EXTRUSION PRESS
Filed May 26, 1964

INVENTOR.
RENZO VASSALLI
BY
McGlew & Toren
ATTORNEYS.

United States Patent Office 3,295,469
Patented Jan. 3, 1967

1

3,295,469
ALIMENTARY PASTE EXTRUSION PRESS
Renzo Vassalli, Uzwil, St. Gall, Switzerland, assignor to Gebruder Buhler, Uzwil, Switzerland, a company of Switzerland
Filed May 26, 1964, Ser. No. 370,293
Claims priority, application Switzerland, May 31, 1963, 6,829/63
13 Claims. (Cl. 107—14)

This invention relates to an alimentary paste extrusion press for the production of so-called short goods, such as short macaronis, in some countries commonly also termed "Hörnli," Vermicellis and other soup additions and the like. More particularly the invention relates to a new and novel extruder head and die assembly of an alimentary paste extrusion press.

Hitherto known extrusion presses of this kind are usually equipped with substantially disk-shaped extrusion dies. These dies are suitable insofar as they assure a substantially uniform distribution of the material to be extruded over the inner surface of the die by relatively simple means, but are sufficient only for relatively average production capacities. For relatively higher output capacities however, considerable difficulties arise on account of the fact that the usual extrusion pressures, ranging between 80 to 100 atü. (1200 to 1500 p.s.i.), become rapidly insufficient and pressures exceeding 150 atü. (2200 p.s.i.) would be required to obtain satisfactory result, which in turn would necessitate extraordinarily heavy and expensive extrusion heads.

It is therefore a main object of this invention to avoid the above cited inconveniences and provide a relatively inexpensive alimentary paste extrusion press of a relatively light weight and relatively high output capacity for the production of so-called short goods, by means of substantially standard type extrusion press component parts.

A characteristic main feature of the extrusion press according to this invention consists in a new and novel combination of an extruder head and die assembly including die adapter means, comprising an extrusion die having a substantially annular shape and multitude of substantially radially disposed extrusion orifices arranged therein, which is detachably secured on the die adapter means and close the annular extrusion die at its front side opposite the extrusion cylinder head.

A further object of this invention consists in providing adapter means forming a flow deflecting surface extending axially and concentrically inside the annular extrusion die.

Another object of the invention consists in providing appropriate cutting means detaching the extruded product at suitable intervals at the surface of the annular die.

Still another object of the invention consists in providing appropriate aerating or predrying means for the product emerging from the extrusion die.

Still other objects of the invention consist in providing centering means and provisional locking means for the annular die during assembly and disassembly.

A still further object of this invention is to provide driving means imparting relative movement to each other of the cutting means and the annular extrusion die.

Other objects and advantages as well as further characteristic features of this invention will become evident from the following detailed description and the appended drawing, showing in FIG. 1 a longitudinal vertical section of a preferred

2 embodiment of the head portion of an alimentary paste extrusion press, and

Figure 2:
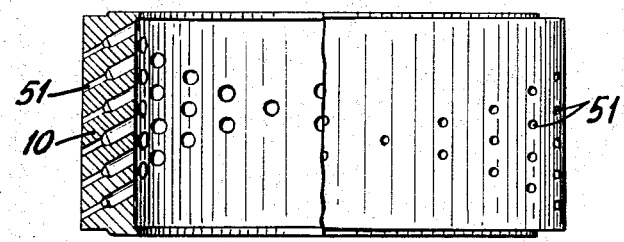

FIG. 2 another convenient arrangement of the extrusion orifices in an annular extrusion die.

Referring now to FIGURE 1 the alimentary paste extrusion press comprises a substantially conventional rotating kneading and extrusion screw 3 disposed in a cylinder 1 which is surrounded by a heating or cooling jacket 2. At the head end of the extrusion screw or worm 3, the cylinder 1 is provided with adapter means 5 for an extrusion die 10 having a substantially annular shape and abutting with one front end against a flange surface of adapter 5. A central portion of adapter 5 shaped to form a flow deflecting surface 6 extends axially and concentrically through the extrusion die 10 closing thereby its end opposite adapter flange portion 5 fixed to head portion of extrusion cylinder 1. The annular extrusion die 10 having a multitude of substantially radially disposed extrusion orifices 11 arranged in its wall and distributed over its entire circumference is detachably secured to the adapter 5 by means of a retaining ring 8 and screws 9. Between either end of the die 10 and adapter 5 sealing members 12 and 13 are disposed. The screws 9 are secured against loss by washers 15. A limited number of spring-loaded locking members 18, such as locking plugs or the like are movably disposed in blind holes arranged in the circumferential surface of the projecting extreme end flange portion forming part of the flow deflecting surface 6 of the die adapter 5 and secured therein against loss by pins 17. Under the action of springs 16 plugs 18 tending to project beyond the circumference provide a provisional support holding the die 10 temporarily during assembly or disassembly of the unit. A multitude of passage holes 21 practiced in the wall of cylinder 1 and the base flange of die adapter 5 enable the paste material in process to flow from cylinder head chamber 20 into space 22, also termed pressure distribution chamber, extrusion die or die adapter chamber, left between the flow deflecting surface 6 of die adapter 5 and the inner surface of annular die 10.

In the central die adapter portion shaped to form a flow deflecting surface 6 driving means, comprising a driving shaft 25 driven by a not shown power source and having a worm 26 fixed thereon at one end and engaging a worm wheel 27 fixed on one end of another shaft 28 are rotatably disposed to impart rotating movement to arms 35 which are detachably secured to the other end 31 of the shaft 28 projecting for this purpose beyond the extreme end flange portion of die adapter 5. The shaft 28 is axially and laterally maintained by and rotatably disposed in a bearing 30 designed to assume axial as well as radial load. For the purpose of detachably securing the arms 35 to the shaft end 31 the arms 35 are undetachably fixed to a central hub sleeve 33 having a bore matching with the shaft end 31 to which they are secured by means of a screw 32. From the hub sleeve 33 the arms 35 first project substantially radially, but change into a substantially axial direction to pass beyond and over the outer surface of the annular die 10. These axial portions of the arms 35 carry cutting members 36 having cutting edges rotating in close proximity to and over the outer surface of extrusion die 10 thereby cutting and detaching portions of desired size and shape at suitable intervals from the extruded product.

At an adequate distance leaving sufficient space for emerging product to be detached the die and cutting assembly is surrounded by a substantially cylindrical jacket 38 extending, in the embodiment shown, axially and vertically from just below the extruder cylinder 1 to a depth appropriate to prevent spilling of falling product. An annular chamber 39 having a conically shaped lower wall 40 disposed immediately above the annular die 10 and the cutting members 36 and provided with a multitude of perforations, is arranged in the uppermost part of the jacket 38. This arrangement provides for adequate aeration and superficial pre-drying of the extruded material to be cut off. The air is supplied by a blower 41, if necessary heated in a heater 42 and finally pressed through perforations of the wall 40 directing the air towards the surface of the annular die 10. A continuous conveyor 45 disposed below the extruder head forwards the detached product to a not shown dryer.

The alimentary paste pre-processed in a mixer which is not shown in the drawing is fed into cylinder 1 where it is further processed and simultaneously forwarded to the extruder head chamber 20 and from there through the passages 21 into die adapter chamber 22. Within this chamber a uniform extrusion pressure distribution is achievable by appropriate shaping of the surfaces influencing the flow of the material, particularly the flow deflecting surface 6 of die adapter 5, which is necessary to obtain a uniform discharge velocity of all orifices 11 collectively of the die 10, and finally also to obtain a uniform final product, the length of which is determined by the number of cutting members 36 and their rotation speed.

An important advantage of the annular extrusion die 10 consists in the strength of its annular shape enabling the application of much higher pressures while simultaneously clamping means (e.g. clamping ring 8, screws 9) of relatively much lighter weight can be used than would be required for disk-shaped extrusion dies.

While the size of the surface area perforated by extrusion orifices of disk-shaped extrusion dies is limited by the occurring stresses, this surface area can be considerably increased in an extrusion head according to this invention, without extensive constructional means. Since moreover the cutting speed in an extrusion head according the invention is uniform over the entire extrusion surface area a product of uniform size and shape is more readily obtained. A further advantage consists in the lighter weight of the component parts enabling much easier handling of the equipment, e.g., during assembly, disassembly and reassembly in the event of changing from one type to another type of product. A still further advantage also consists in the remarkably high degree of safety that can be achieved.

A modification of the arrangement of the extrusion orifices in the wall of the extrusion die as indicated by the reference cypher 51 in FIGURE 2 showing orifices 51 disposed substantially radially and inclined in respect of the outer surface and/or the axis of the annular extrusion die 10, enables the production of goods having distinctly inclined cuts at both ends. The shapes shown may of course be further modified without departing from the basic spirit of this invention. An essential feature only consists in the type or character of the reciprocal relative movement of the cutting members 36 and the extrusion die by which the desired portions of the extruded product are detached at the surface of the die 10. This signifies that it would also be possible to rotate for example the extrusion die 10 while stationary cutting members 36 are used. There are furthermore no essential reasons for solely horizontal arrangement of the extrusion cylinder 1. It is therefore also possible to dispose the cylinder with the worm 3 vertically, as already well-known in the art.

I claim:

1. An alimentary extrusion press comprising a material feeding housing, said housing having an opening in the wall thereof, means to force material in the housing out through said opening, an adapter having a plate portion attached to said housing and having an opening therein which communicates with said housing opening, an elongated extension extending downwardly from the center of said plate portion, an extrusion die having a plurality of openings therein and adapted to be fastened between a lower end of said plate portion extension and a surface of said plate portion so as to provide a material receiving space between said extension and said die, said space communicating with said housing and plate openings, and means carried by said extension to fasten said die to said adapter plate portion.

2. An alimentary dough extrusion press comprising a material feeding housing, said housing having passage means in the wall thereof, means to force material in the housing out through said passage means, adapter means attached to said housing adjacent said passage means including an elongated extension affixed to said housing adjacent said passage means, an extrusion die having a plurality of extrusion openings therein and adapted to be fastened between an end of said extension and said adapter means and defining a material receiving space between said extension and said die, said space communicating with said passage means having a wall shaped as a flow deflecting surface to direct material to said extrusion openings, and means carried by said extension to fasten said die to said adapter means.

3. An alimentary paste extrusion press comprising an extruder head, an annular die having a plurality of extrusion orifices extending therethrough, an adapter connected to said extruder head including a central portion extending axially through said die, said central portion including an outer end closing said annular die and defining a pressure distribution chamber between said central portion and said annular die, said central portion having a flow deflecting surface for uniformly distributing the material received in said pressure distribution chamber to said extrusion orifices, means carried by said outer end to secure said die to said adapter, passage means defined between said head and said pressure distribution chamber for the flow of material from said head to said pressure distribution chamber, and means in said head to force material from said head to said pressure distribution chamber.

4. An alimentary paste extrusion press according to claim 3, including a cutting member disposed on the exterior of said die and means mounting said cutting member and said die to permit relative movement of said member in respect to the surface of said die for cutting and separating portions of the extruded material after emerging from the orifices.

5. An alimentary paste extrusion press, according to claim 4, wherein said die is stationarily mounted, and means rotatably mounting said cutting member.

6. An alimentary paste extrusion press, according to claim 3, wherein said extrusion orifices are disposed substantially radially and at substantially right angles to the outer surface of said die.

7. An alimentary paste extrusion press, according to claim 3, wherein said extrusion orifices are disposed substantially radially and inclined in respect to the outer surface of said die.

8. An alimentary paste extrusion press, according to claim 3, including means for aerating material emerging from the orifices of said die.

9. An alimentary paste extrusion press, according to claim 8, wherein said aerating means includes means for directing streams of air onto the outer surface of said annular extrusion die.

10. An alimentary paste extrusion press, according to claim 3, wherein said adapter includes a flat plate inner portion adapted to rest against said extruder head and an outer widened portion, and a retaining ring secured to said outer widened portion and holding said annular die to said adapter.

11. An alimentary paste extrusion press, according to claim 10, wherein said central portion is provided with an exterior surface forming said flow deflecting surface.

12. An alimentary paste extrusion press, according to claim 10, including means for detachably securing said ring to the outer widened portion of said adapter.

13. An alimentary paste extrusion press, according to claim 3, including a shaft disposed centrally within said adapter, a driving arm yoke including two arm portions each carrying a cutting member and a central hub member fitted over said shaft and connected thereto for rotation therewith, and driving means connecting said shaft adjacent the juncture of said adapter and said extruder head.

References Cited by the Examiner

UNITED STATES PATENTS

| | | |
|---|---|---|
| 1,553,573 | 9/1925 | Tanzi _____ 107—14.6 |
| 1,952,556 | 3/1934 | MacFarlane _____ 18—12 |
| 2,525,970 | 10/1950 | Spier et al. _____ 18—12 X |
| 3,010,150 | 11/1961 | Meakin _____ 18—12 |
| 3,108,055 | 10/1963 | Grant. |

BILLY J. WILHITE, *Primary Examiner.*

WALTER A. SCHEEL, *Examiner.*